United States Patent [19]

Baglin et al.

[11] 4,442,072

[45] Apr. 10, 1984

[54] SELECTIVE RECOVERY OF BASE METALS AND PRECIOUS METALS FROM ORES

[75] Inventors: Elizabeth G. Baglin; John M. Gomes, both of Reno, Nev.

[73] Assignee: The United States of America as represented by the Secretary of the Interior, Washington, D.C.

[21] Appl. No.: 435,534

[22] Filed: Oct. 20, 1982

[51] Int. Cl.³ .................... C01G 55/00; C01G 7/00; C01G 3/10; C01G 53/10
[52] U.S. Cl. ............................... 423/22; 423/41; 423/45; 423/150; 75/82; 75/83; 75/74; 75/92; 75/101 R; 75/121; 75/115; 75/118 R
[58] Field of Search ............... 423/22, 150, 41, 45; 75/101 R, 121, 115, 118 R, 83, 74, 82, 92

[56] References Cited

U.S. PATENT DOCUMENTS

| | | | |
|---|---|---|---|
| 3,293,027 | 7/1964 | Mackiw et al. | 75/115 |
| 4,108,639 | 8/1978 | Lake et al. | 423/22 |
| 4,337,226 | 6/1982 | Peasley et al. | 423/22 |

Primary Examiner—Edward J. Meros
Assistant Examiner—Robert L. Stoll
Attorney, Agent, or Firm—William S. Brown; Donald A. Gardiner

[57] ABSTRACT

Metal values are recovered from ore concentrates by forming a sulfide matte, grindng the matte, leaching with sulfuric acid at elevated temperature to selectively extract nickel and iron, and roasting and leaching the residue with dilute sulfuric acid to selectively extract copper. The residue contains a high concentration of platinum, palladium and gold.

3 Claims, No Drawings

SELECTIVE RECOVERY OF BASE METALS AND PRECIOUS METALS FROM ORES

This invention relates to recovery of base metals, particularly nickel, iron and copper, and precious metals, i.e., platinum group metals and gold, from sulfide ores or concentrates. U.S. Pat. No. 4,337,226, the disclosure of which is incorporated herein by reference, discloses recovery of these metals from sulfide ore concentrates by means of a process comprising (1) smelting with a flux to form a matte, (2) dry grinding the matte to a size suitable for leaching, (3) leaching, in a first stage, with sulfuric acid to selectively extract nickel and iron, and (4) leaching, in a second stage, the residue with a solution comprising sulfuric acid and sodium hypochlorite or hydrogen peroxide to extract copper and the precious metals.

It has now been found, according to the present invention, that the process of U.S. Pat. No. 4,337,226 may be still further improved by employing in place of the second-stage leach a procedure comprising roasting followed by a dilute sulfuric acid leach, by means of which copper is selectively extracted, with the precious metals remaining in the residue. Thus, copper, as well as nickel and iron values, are selectively extracted, thereby avoiding the necessity of subsequent separation of copper and precious metals.

Smelting of the concentrate is by conventional means comprising fusing in the presence of an amount of flux sufficient to lower the melting point of the mixture from 1600° to about 1300° C. The preferred flux consists of a combination of lime and fluorspar. Silica may also be added to aid in the separation of iron oxides into the slag. After melting, the charge is held in the molten state in an essentially oxygen-free atmosphere for approximately ½ hr. During this time the temperature is controlled to between 1,400° and 1,600° C., preferably between 1,500° and 1,550° C. After cooling, the matte is separated from the slag. More than 95 pct of the copper, nickel, and precious metals are recovered in the matte.

The matte is crushed to minus ¼-inch chunks and then ground in a bill mill to at least minus 35 mesh but preferably minus 200 mesh, smaller particles being leached more rapidly and completely. Care must be exercised during grinding to prevent overheating and decomposing the sulfides. Dry grinding of the matte is preferred but wet grinding is acceptable. Nickel removal is generally more complete if the matte is ground dry.

Recovery of the metal values is accomplished in two stages. In the first stage, matte is leached at about 40° to 100° C., at atmospheric pressure and with 10 to 40 wt-pct, preferably about 20 wt-pct, $H_2SO_4$. Higher extraction of nickel and iron results when the temperature is between about 65° and 95° C. The reaction is essentially complete in 2 hours at 65° C., but higher temperatures and a longer leaching period, e.g., about 4 hours, may be required for maximum extraction. The $H_2SO_4$ extracts more than 99 pct of the nickel and iron but none of the copper or precious metal values. Since the leach is selective, the separation of nickel and copper, which is a major problem with existing processes, is eliminated.

Iron may be removed from the pregnant liquor by standard procedures, such as precipitation with ammonia or jarosite formation after prior oxidation of ferrous ions to the ferric state. The nickel can then be recovered from solution by hydrogen reduction or electrowinning. Material and equipment costs for the first leaching stage are low, and the costly autoclave commonly used for matte leaching is unnecessary. The offgas is $H_2S$ with only traces of $SO_2$. The $H_2S$ can be used in a later stage of the process to precipitate copper, or can be converted by the Claus process to elemental sulfur which can be marketed.

X-ray diffraction of the residue from the first-stage leach has shown that the copper is present as djurleite, $Cu_{1.93}S$. The second stage, involving roasting and leaching extracts more than 98 pct of the copper from the first-stage residue, the residue from the second stage being a high-grade precious metal concentrate. The second-stage procedure involves roasting the residue from the first stage at a temperature of about 300° to 500° C., preferably about 330° to 400° C., for a period of about 1 to 6 hours. This results in oxidation of the copper sulfide, i.e., $Cu_{1.93}S$ to $CuSO_4$ and $Cu_2O$, with minimal formation of $SO_2$. The copper is then dissolved by dilute, i.e., about 0.2 to 1 molar, sulfuric acid at ambient temperature and pressure. One mole of $H_2SO_4$ per mole of copper is usually sufficient to extract more than 98 percent of the copper in about ½ hour. Acid concentration is not critical. In practice, an acid concentration compatible with an electrowinning operation would be used in leaching. More than 99 percent of the precious metals remain in the residue which is not contaminated by elemental sulfur because the sulfur is removed as sulfate during the leaching process.

The copper can be recovered from the pregnant leach liquor by electrowinning. Alternately, the copper can be precipitated by sparging the solution with $H_2S$ evolved during the first leaching stage. The CuS formed may be sent to a copper smelter for further processing. The copper can also be cemented from solution by adding metallic iron.

The process of the invention will be more specifically illustrated by the following example.

EXAMPLE

A charge consisting of 1,500 grams of flotation concentrate, 110 grams of CaO, and 55 grams each of $CaF_2$ and $SiO_2$, was charged into a graphite crucible. A flow of argon gas was maintained over the top of the charge in order to exclude oxygen. The sample was heated in an induction furnace to 1,360° to 1,540° C. for approximately ½ hour and was then poured into a preheated conical graphite mold. After cooling, the matte separated cleanly from the slag. The matte weighed 278 grams and the slag 1,314 grams. One hundred twenty eight grams of material volatilized. The extraction of the copper, nickel, cobalt, platinum group metal, and gold values into the matte exceeded 95 pct. The analysis of the concentrate and resulting slag and matte are shown in the following table.

|  | Oz/ton | | | Wt-pct | | | |
| --- | --- | --- | --- | --- | --- | --- | --- |
|  | Pt | Pd | Au | Cu | Ni | Fe | S |
| Flotation concentrate | 3.67 | 8.13 | 0.55 | 1.4 | 2.1 | 10.6 | 7.2 |
| Matte | 15.15 | 41.47 | 2.66 | 7.5 | 10.5 | 53 | 31.5 |
| Slag | .16 | .36 | .02 | .1 | .1 | 1.2 | 1.0 |

The matte was broken up and dry ground to minus 200 mesh in a small ball mill.

First Leaching Stage

A 275-gram charge of the pulverized matte was mixed with 2,580 ml of 2.06 M $H_2SO_4$ in a 4-liter resin kettle. The leaching conditions were 4 hrs at 95° to 100° C. with continuous agitation. The mixture was cooled and filtered and the products were analyzed. The pregnant solution contained more than 99 pct of the nickel and iron and none of the copper. The solution analyzed in g/l: Ni, 12; Fe, 56; Cu, <0.001. Pt, Pd, and Au were not detected in the leach liquor. The 30 g of residue contained 66 wt-pct Cu, 1 wt-pct each Ni and Fe, 163 oz of Pt/ton, 380 oz of Pd/ton, and 23 oz of Au/ton.

Second Stage Roast-Leach

The residue from the first leaching stage was roasted at 350° to 415° C. for 4 hours. X-ray analysis showed the presence of $CuSO_4$, $Cu_2O$, and a trace of $Cu_2(SO_4)O$. Five grams of the roasted material, containing 36 millimoles copper, was leached with 200 ml of 0.21 M $H_2SO_4$ (42 millimoles) at 25° C. for 5 hours. Extraction was essentially complete in ½ hour. Ninety-eight percent of the copper was extracted and could be recovered from the pregnant solution by electrowinning. The residue, which contained more than 98 percent of the precious metals, analyzed 1,960 oz/ton Pt, 6,550 oz/ton Pd, 205 oz/ton Au, 10.2 wt-pct Cu, 0.19 wt-pct Ni, an 0.44 wt-pct Fe.

We claim:
1. A process for recovery of nickel, iron, copper, platinum, palladium and gold values from ore concentrates consisting essentially of:
   (a) smelting the concentrate with a flux to form a matte and slag,
   (b) grinding the matte to a particle size suitable for leaching,
   (c) leaching, in a first-stage, the ground matte with sulfuric acid of a concentration of about 10 to 40 wt-pct at a temperature of about 40° to 100° C. and atmospheric pressure to selectively extract nickel and iron values, and
   (d) roasting and leaching, in a second-stage, the residue from the first-stage leach, the roasting being at a temperature of about 300° to 500° C., and the leaching being with dilute sulfuric acid at ambient temperature and pressure, to selectively extract copper values and provide a residue containing a high concentration of platinum, palladium and gold.

2. The process of claim 1 in which the ore is a Stillwater complex sulfide ore.

3. The process of claim 1 in which the roasting in step (d) is at a temperature of about 330° to 400° C., and the leaching is accomplished with sulfuric acid of a concentration of about 0.2 to 1 molar.

* * * * *